(12) United States Patent
Xu-Rabl et al.

(10) Patent No.: US 9,133,376 B2
(45) Date of Patent: Sep. 15, 2015

(54) SHAPE-MEMORY MATERIAL BASED ON A STRUCTURAL ADHESIVE

(71) Applicant: SIKA TECHNOLOGY AG, Baar (CH)

(72) Inventors: Rui Xu-Rabl, Zurich (CH); Matthias Gössi, Uster (CH); Jürgen Finter, Freiburg (DE)

(73) Assignee: SIKA TECHNOLOGY AG, Baar (CH)

( * ) Notice: Subject to any disclaimer, the term of this patent is extended or adjusted under 35 U.S.C. 154(b) by 96 days.

(21) Appl. No.: 14/206,397

(22) Filed: Mar. 12, 2014

(65) Prior Publication Data

US 2015/0017435 A1   Jan. 15, 2015

Related U.S. Application Data

(63) Continuation of application No. PCT/EP2012/068031, filed on Sep. 14, 2012.

(30) Foreign Application Priority Data

Sep. 14, 2011   (EP) .................................... 11181294

(51) Int. Cl.
*C09J 163/00* (2006.01)
*C08J 3/24* (2006.01)
(Continued)

(52) U.S. Cl.
CPC ............. *C09J 163/00* (2013.01); *B29C 43/003* (2013.01); *B29C 43/52* (2013.01); *C08G 18/10* (2013.01); *C08G 18/4866* (2013.01); *C08G 18/755* (2013.01); *C08G 59/00* (2013.01); *C08G 65/336* (2013.01); *C08J 3/243* (2013.01); *C08J 3/246* (2013.01); *C08J 3/247* (2013.01); *C09J 9/00* (2013.01); *C09J 175/04* (2013.01);
(Continued)

(58) Field of Classification Search
None
See application file for complete search history.

(56) References Cited

U.S. PATENT DOCUMENTS 3,971,751 A    7/1976  Isayama et al.
4,657,986 A *  4/1987  Isayama et al. ............... 525/407
(Continued)

FOREIGN PATENT DOCUMENTS

CN      1496394 A      5/2004
DE   102009035595 A1   2/2010
(Continued)

OTHER PUBLICATIONS

Notification of Transmittal of the International Preliminary Report on Patentability (Form PCT/IB/338, issued on Mar. 27, 2014 and PCT/IB/373 issued on Mar. 18, 2014) and the Written Opinion of the International Searching Authority (Form PCT/ISA/237) by the International Bureau of WIPO in corresponding International Application No. PCT/EP2012/068031, (8 pages).

(Continued)

*Primary Examiner* — Robert S Loewe
(74) *Attorney, Agent, or Firm* — Buchanan Ingersoll & Rooney PC (57) ABSTRACT

A composition including at least one curable structural adhesive, and at least one chemically crosslinked elastomer on the bases of a silane-functional polymer, wherein the elastomer is in the form of an interpenetrating polymer network in the structural adhesive. The composition can be used to form a shape-memory material and is suitable for reinforcing cavities in structural components such as, for example, in automobile bodies.

16 Claims, 3 Drawing Sheets

(51) Int. Cl.
*C09J 9/00* (2006.01)
*C08G 18/48* (2006.01)
*C08G 18/75* (2006.01)
*C08G 59/00* (2006.01)
*C08G 18/10* (2006.01)
*C09J 175/04* (2006.01)
*C08G 65/336* (2006.01)
*B29C 43/00* (2006.01)
*B29C 43/52* (2006.01)
*B29K 63/00* (2006.01)
*B29K 75/00* (2006.01)
*B29K 105/00* (2006.01)
*B29K 105/24* (2006.01)
*B29L 31/30* (2006.01)

(52) U.S. Cl.
CPC ......... *B29K2063/00* (2013.01); *B29K 2075/00* (2013.01); *B29K 2105/0005* (2013.01); *B29K 2105/0088* (2013.01); *B29K 2105/0097* (2013.01); *B29K 2105/24* (2013.01); *B29L 2031/30* (2013.01); *B29L 2031/3005* (2013.01); *C08G 2280/00* (2013.01); *C08J 2300/10* (2013.01); *C08J 2375/04* (2013.01); *Y10T 428/2848* (2015.01); *Y10T 428/2852* (2015.01)

(56) References Cited

U.S. PATENT DOCUMENTS

| | | | | |
|---|---|---|---|---|
| 4,766,183 A * | 8/1988 | Rizk et al. | | 525/454 |
| 4,981,728 A * | 1/1991 | Homma et al. | | 427/386 |
| 5,109,064 A * | 4/1992 | Wakabayashi et al. | | 525/100 |
| 5,296,582 A * | 3/1994 | Fujita et al. | | 528/27 |
| 5,331,062 A * | 7/1994 | Sorathia et al. | | 525/454 |
| 5,336,703 A * | 8/1994 | Homma et al. | | 523/435 |
| 5,500,464 A * | 3/1996 | Homma et al. | | 523/435 |
| 5,530,063 A * | 6/1996 | Nagai et al. | | 525/101 |
| 5,703,178 A * | 12/1997 | Gasmena | | 525/476 |
| 6,153,709 A * | 11/2000 | Xiao et al. | | 525/528 |
| 6,207,766 B1 | 3/2001 | Doi et al. | | |
| 6,322,890 B1 | 11/2001 | Barron et al. | | |
| 6,505,455 B1 * | 1/2003 | Georgeau | | 52/746.11 |
| 6,569,980 B1 * | 5/2003 | Masaoka et al. | | 528/27 |
| 8,491,749 B2 * | 7/2013 | Gorodisher et al. | | 156/330 |
| 2002/0016411 A1 * | 2/2002 | Ando et al. | | 525/100 |
| 2004/0092640 A1 | 5/2004 | Makino et al. | | |
| 2006/0128919 A1 * | 6/2006 | Okamoto et al. | | 528/25 |
| 2006/0264545 A1 * | 11/2006 | Wakabayashi et al. | | 524/394 |
| 2007/0173620 A1 * | 7/2007 | Kono | | 525/477 |
| 2008/0051547 A1 * | 2/2008 | Wakabayashi et al. | | 528/18 |
| 2009/0280330 A1 | 11/2009 | Xie et al. | | |
| 2010/0035049 A1 | 2/2010 | Xie | | |
| 2011/0120646 A1 * | 5/2011 | Gorodisher et al. | | 156/330 |
| 2012/0082840 A1 * | 4/2012 | Herr et al. | | 428/221 |

FOREIGN PATENT DOCUMENTS

| | | | |
|---|---|---|---|
| DE | 102009035621 A1 | 3/2010 | |
| DE | 102009045903 A1 | 4/2011 | |
| EP | 1380625 A1 | 1/2004 | |
| EP | 2019027 A1 | 1/2009 | |
| EP | 2182025 A1 | 5/2010 | |
| WO | WO 2010108716 A1 * | 9/2010 | ............. C09J 143/04 |

OTHER PUBLICATIONS

"Semi-interpenetrating polymer network", IUPAC Compendium of Chemical Technology, (1997), 2nd Edition, (1 page).
Chinese Office Action issued in corresponding Chinese Patent Application No. 201280036696.2 dated Dec. 29, 2014, 7 pages.
International Search Report (PCT/ISA/210) mailed on Feb. 28, 2013, by the European Patent Office as the International Searching Authority for International Application No. PCT/EP2012/068031.
Written Opinion (PCT/ISA/237) mailed on Feb. 28, 2013, by the European Patent Office as the International Searching Authority for International Application No. PCT/EP2012/068031.

\* cited by examiner

SHAPE-MEMORY MATERIAL BASED ON A STRUCTURAL ADHESIVE

RELATED APPLICATION(S)

This application claims priority as a continuation application under 35 U.S.C. §120 to PCT/EP2012/068031, which was filed as an International Application on Sep. 14, 2012 designating the U.S., and which claims priority to European Application No. 11181294.7 filed in Europe on Sep. 14, 2011. The entire contents of these applications are hereby incorporated by reference in their entireties.

FIELD

The present disclosure is in the field of compositions comprising curable structural adhesives, for example, shape-memory materials. In addition, the disclosure relates to a reinforcing element for reinforcing cavities of structural components such as those used in, for example, automotive bodies and the like.

BACKGROUND INFORMATION

Hollow structural components are frequently used in designs of many types. This type of construction makes it possible to keep the weight of the construction low as well as the cost of materials, but stability and strength are often lost with this type of construction. Because of the larger surface area of the hollow component, these cavities also present a larger surface for attack by corrosion, if moisture or dirt penetrates into them. Likewise, noise caused by wind or vibrations can be transmitted in or along the cavities.

Because of the shape and/or narrow extent of such cavities, it is often difficult to efficiently reinforce and seal them or to prevent noise transmission.

To improve the mechanical properties of structural components containing cavities, for example, it is customary in many cases to use or incorporate local reinforcing elements into the components. Such reinforcing elements can be made of metals or plastics or of combinations of these materials. Structural foams are often used in locations to which access is difficult and which are to be reinforced or sealed only after assembly of the component. This is the case, for example, in the production of automotive structures and/or bodies. The advantage of structural foams is that they can be introduced into a cavity in an unexpanded state and can then be foamed in place, for example, with an increase in temperature. Thus, for example, after assembling the reinforcing element, the inside walls of the cavity may also be coated completely by means of cathodic dip painting (CDP) and only then reinforced by foaming the structural adhesive. Foaming can be performed while oven-curing the CDP layer.

A disadvantage of such reinforcing elements is that the mechanical properties of the structural adhesive are impaired by the foaming process.

SUMMARY

According to an exemplary aspect, provided is a composition, comprising: at least one curable structural adhesive; and at least one chemically crosslinked elastomer formed from a silane-functional polymer.

According to an exemplary aspect, provided is a method of producing an exemplary composition, the method comprising: mixing the curable structural adhesive with a silane-functional polymer; and crosslinking the silane-functional polymer in the mixture to form an elastomer.

According to an exemplary aspect, provided is a molded body, wherein the molded body is formed from a process comprising: heating an exemplary composition to a temperature above its glass transition temperature $T_g$; shaping the composition under the tension of the chemically crosslinked elastomer based on a silane-functional polymer; and cooling the shaped composition to a temperature below its glass transition temperature $T_g$.

According to an exemplary aspect, provided is a reinforcing agent for reinforcing structural components in cavities, comprising a support and an exemplary molded body, wherein the molded body is applied to the support.

According to an exemplary aspect, provided is a method for forming a molded body, the method comprising: heating an exemplary composition to a temperature above its glass transition temperature $T_g$; shaping the composition under the tension of the chemically crosslinked elastomer based on a silane-functional polymer; and cooling the shaped composition to a temperature below its glass transition temperature $T_g$.

BRIEF DESCRIPTION OF THE DRAWINGS

Exemplary embodiments of the disclosure are explained in greater detail in view of the drawings. The same elements in the various figures are provided with the same reference numerals. The disclosure is not limited to the exemplary embodiments shown and described herein.

DETAILED DESCRIPTION

According to an exemplary aspect, disclosed is a reinforcing element, which can overcome the disadvantages of the related art and can make it possible, for example, to close a gap between a cavity and a reinforcing element without having any negative effects on the mechanical properties of the structural adhesive.

It has been found that with a composition according to an exemplary aspect, it is possible to implement shape-memory materials which undergo changes in their shape due to the influence of temperature and thus expand in a desired direction without undergoing any increase in volume due to a foaming process, for example.

In an exemplary aspect, disclosed is a composition comprising at least one curable structural adhesive; as well as at least one chemically crosslinked elastomer based on a silane-functional polymer.

The chemically crosslinked elastomer can be present in the form of a penetrating polymer network in the structural adhesive.

Substance names beginning with "poly" such as polyol or polyisocyanate in the present document denote substances that formally contain two or more of the functional groups occurring in their name per molecule. In the present document, the term "polymer" comprises, on the one hand, a collection of macromolecules that are chemically uniform but differ with respect to the degree of polymerization, molecular weight and chain length and are produced by a polyreaction (polymerization, polyaddition, polycondensation). On the other hand, this term also includes derivatives of such a group of macromolecules from polyreactions, i.e., compounds which are obtained by reactions, such as additions or substitutions of functional groups on given macromolecules and may be chemically uniform or chemically heterogeneous. This term also includes so-called prepolymers, i.e., reactive oligomeric preadducts, whose functional groups are involved in the synthesis of macromolecules. The term "polyurethane polymer" includes all polymers synthesized by the so-called diisocyanate polyaddition process. This also includes polymers which are virtually or entirely free of urethane groups. Examples of polyurethane polymers include polyether polyurethanes, polyether polyureas, polyureas, polyester polyureas, polyisocyanurate and polycarbodiimide.

In the present document, the terms "silane" and "organosilane" refer to compounds, which, on the one hand, contain at least one, for example, two or three alkoxy groups or acyloxy groups bound directly to the silicon atoms by Si—O bonds and, on the other hand, at least one organic radical bound by an Si—C bond directly to the silicon atom. Those skilled in the art are also familiar with such silanes as organoalkoxysilanes and/or organoacyloxysilanes.

Accordingly, the term "silane group" refers to the group that contains silicon and is bound to the organic radical of the silane by way of the Si—C bond. The silanes and/or the silane groups have the property of hydrolyzing when they come in contact with moisture. This forms organosilanols, i.e., organosilicon compounds containing one or more silanol groups (Si—OH groups) and through subsequent condensation reactions, organosiloxanes, i.e., organosilicon compounds containing one or more siloxane groups (Si—O—Si groups). The term "silane functional" refers to compounds containing silane groups. "Silane-functional polymers" are thus polymers containing at least one silane group.

"Aminosilanes" and/or "mercaptosilanes" refer to organosilanes whose organic radical has an amino group and/or a mercapto group. "Primary aminosilanes" refer to aminosilanes which have a primary amino group, i.e., an $NH_2$ group, which is bound to an organic radical. "Secondary aminosilanes" refer to aminosilanes, which have a secondary amino group, i.e., an NH group bound to two organic radicals. "Molecular weight," as used in the present document, is understood to refer to the average molecular weight $M_n$ (number average).

The term "penetrating polymer network" is understood in the present document in accordance with the definition of a "semi-interpenetrating polymer network" (SIPN) according to *IUPAC Compendium of Chemical Technology*, 2nd Edition (1997). The SIPN thus comprises at least one network as well as at least one linear or branched polymer, where this polymer at least partially penetrates the network. In the composition according to the disclosure, the elastomer forms the network and the polymer is a component of the curable structural adhesive.

In the present document, a "chemically crosslinked elastomer" is understood to be an elastomer crosslinked by covalent chemical bonds. In contrast with that, the crosslinking of a thermoplastic elastomer is based on physical interactions. A chemically crosslinked elastomer differs from a thermoplastic elastomer in that it swells in a suitable solvent but does not dissolve. However, a thermoplastic elastomer will dissolve completely in a suitable solvent.

The presence of a chemically crosslinked elastomer can be determined in accordance with ASTM D 2765, for example.

In the present document, the glass transition temperature $T_g$ of a composition is understood to refer to the glass transition temperature of the curable structural adhesive, for example, that of the epoxy resin A, or the glass transition temperature of the chemically crosslinked elastomer, depending on which is higher. In embodiments with a curable structural adhesive based on solid epoxy resin, the glass transition temperature $T_g$ of the composition can refer to the glass transition temperature $T_g$ of the solid epoxy resin. In embodiments with a curable structural adhesive based on a liquid epoxy resin, the glass transition temperature $T_g$ of the composition can refer to the glass transition temperature $T_g$ of the chemically crosslinked elastomer. The glass transition temperature $T_g$ and the melting points can be measured by DSC (differential scanning colorimetry), wherein the measurements are performed on 5 mg samples using a Mettler Toledo 822e instrument at a heating rate of 10° C./min up to 180°. The measured values are determined from the measured DSC curve with the help of DSC software.

The composition according to the disclosure which is a "shape-memory material") may be brought to a certain shape ("original shape") in its production or processing and after being shaped in this way has a solid consistency, for example, when the composition is at a temperature below its glass transition temperature $T_g$. In this form, the chemically crosslinked elastomer, which is present, for example, as a penetrating polymer network in the structural adhesive, can be in a relaxed form. The composition is then heated to a temperature above its glass transition temperature $T_g$ as needed and converted to any shape ("temporary shape"). In this temporary shape, the chemically crosslinked elastomer is present in a relaxed form. The composition is kept in this temporary shape and the temperature of the composition is again lowered to a temperature below its glass transition $T_g$, so that the composition solidifies in the temporary shape. In this temporary shape, the composition is stable in storage and can be subjected to processing, for example, punching or cutting. If the composition is heated back to a temperature above the glass transition temperature $T_g$ at a later point in time, then the elastomer will return to its relaxed form and thus the entire composition will return to its original form. The disclosure therefore also relates to a shape-memory material comprising a composition according to the disclosure.

The composition according to the disclosure can be a shape-memory material, which is solid at room temperature (23° C.), which allows optimal handling of the material in its original shape and in its temporary shape.

In order for the composition according to the disclosure to be solid at room temperature, it has a glass transition temperature $T_g$ which is above room temperature. Otherwise, for example, the composition according to the disclosure after being converted to its temporary shape remains in the temporary shape at room temperature.

The composition according to the disclosure can have a glass transition temperature $T_g$ in the range of 23° C. to 95° C., for example, from 30° C. to 80° C., for example, from 35° C. to 75° C.

In addition, the surface of the composition according to the disclosure is, for example, not tacky at room temperature, which facilitates its handling.

The curable structural adhesive can be a heat-curing structural adhesive, which can have a curing temperature in the range of 120° C. to 220° C., for example, 160° C. to 200° C.

If the curable structural adhesive is a heat-curing structural adhesive, then care can be taken in processing the composition in which it is brought to its temporary shape to ensure that the composition is not heated so much that the curing process begins.

The curable structural adhesive can be an epoxy resin composition comprising at least one epoxy resin A and at least one curing agent B for epoxy resins which is activated by an elevated temperature. This can be a single-component epoxy resin composition.

This epoxy resin A, which contains more than one epoxy group per molecule on the average and can be a solid epoxy resin or a mixture of a solid epoxy resin with a liquid epoxy resin. The term "solid epoxy resin" is a term well known to those skilled in the art in the field of epoxy resins and is used in contrast with "liquid epoxy resin." The glass transition temperature $T_g$ of solid resins is above room temperature.

Exemplary solid epoxy resins are those with formula (I):

where the substituents $R^1$ and $R^2$, independently of one another, stand for either H or $CH_3$. In addition, the variable s stands for a value of $\geq 1$, for example, $\geq 1.5$, for example, 2 to 12.

Exemplary solid epoxy resins have a glass transition temperature $T_g$ in the range of 23° C. to 95° C., for example, from 30° C. to 80° C., for example, from 35° C. to 75° C.

Exemplary solid epoxy resins are commercially available, for example, from Dow Chemical Company, USA, from Huntsman International LLC, USA or from Hexion Specialty Chemicals Inc., USA.

Exemplary liquid epoxy resins which may be used together with a solid epoxy resin have the formula (II):

where again the substituents $R^1$ and $R^2$, independently of one another, stand for either H or $CH_3$. In addition, the variable r stands for a value from 0 to 1. For example, r can have a value of $\leq 0.2$.

For example, these can be diglycidyl ethers of bisphenol A (DGEBA), of bisphenol F and of bisphenol A/F. The designation "A/F" here refers to a mixture of acetone with formaldehyde which is used as a starting material in this synthesis. Such liquid resins are available commercially, for example, under the brand names Araldite® GY 250, Araldite® PY 304, Araldite® GY 282 from Huntsman International LLC, USA or D.E.R.® 331 or D.E.R.® 330 from Dow Chemical Company, USA or under the brand names Epikote®828 or Epikote® 862 from Hexion Specialty Chemicals Inc., USA.

Depending on the specific embodiment, the epoxy resin used as one of the starting compounds in curable structural adhesives may also be a liquid epoxy resin.

Other suitable epoxy resins include so-called novolacs, which have the following formula (III), for example:

where the radical X stands for a hydrogen atom or a methyl group. The radical Y stands for $-CH_2-$ or a radical of formula (IV):

In addition, the variable z stands for a value of 0 to 7, for example, a value of $\geq 3$.

For example, these are phenolic novolacs or cresol novolacs (Y stands for $-CH_2-$).

Such epoxy resins are available commercially under the brand names EPN or ECN as well as Tactix® 556 from Huntsman International LLC, USA or in the product series D.E.N.™ from Dow Chemical Company, USA.

Epoxy resin A can be a solid epoxy resin of formula (I). In an exemplary embodiment, the heat-curable epoxy resin composition contains at least one solid epoxy resin of formula (I) as well as at least one liquid epoxy resin of formula (II).

Epoxy resin A can be present in an amount of 2 to 90 wt %, for example, 5 to 70 wt %, for example, 10 to 60 wt %, based on the total weight of the curable structural adhesive.

The curing agent B for epoxy resins is activated by elevated temperatures. Curing agent B can be a curing agent selected from dicyanodiamide, guanamines, guanidines, aminoguanidines and derivatives thereof; substituted ureas, for example, 3-(3-chloro-4-methylphenyl)-1,1-dimethylurea (chlortolurone) or phenyldimethylureas, for example, p-chlorophenyl-N,N-dimethylurea (monuron), 3-phenyl-1,1-dimethylurea (fenuron), 3,4-dichlorophenyl-N,N-dimethylurea (diuron) as well as imidazoles and amine complexes.

Exemplary as curing agent B is dicyanodiamide, for example, in combination with a substituted urea. An advantage of the combination of dicyanodiamide with a substituted urea is the accelerated curing of the composition thereby achieved.

The amount of curing agent B can be 0.05 to 8 wt %, for example, 0.1 to 6 wt %, for example, 0.2 to 5 wt %, based on the total weight of the curable structural adhesive.

The term "curing agent" in the present document also includes catalysts and catalytically active compounds. In this case, when using a catalyst or a catalytically active compound as curing agent B, the amount of curing agent B in the total curable structural adhesive can lie in the lower range of the value range given.

In addition, the epoxy resin composition may comprise at least one impact strength modifier.

The term "impact strength modifier" in this document is understood to refer to an additive of an organic polymer to an epoxy resin matrix, which creates a definite increase in toughness when used even in small amounts, for example, between 0.1 and 20 wt % with respect to the curable structural adhesive, and is thus capable of absorbing higher impact stress before the matrix breaks or tears.

Suitable impact strength modifiers include, for example, reactive liquid rubbers based on nitrile rubber or derivatives of polyether polyol polyurethane, core-shell polymers and similar systems with which those skilled in the art are familiar.

Suitable impact strength modifiers are described as impact strength modifiers D in the European patent application with the application number EP 08168009.2, the content of which is incorporated by reference herein.

The curable structural adhesive may contain other components such as those generally used in curable structural adhesives.

For example, the curable structural adhesive can additionally contain at least one filler. These fillers can be mica, talc, kaolin, wollastonite, feldspar, syenite, chlorite, bentonite, montmorillonite, calcium carbonate (precipitated or ground), dolomite, quartz, silicic acids (pyrogenic or precipitated), cristobalite, calcium oxide, aluminum hydroxide, magnesium oxide, hollow ceramic beads, hollow glass beads, hollow organic beads, glass beads, colored pigments. The fillers are understood to include both the coated organic forms and the uncoated forms that are known and available commercially to those skilled in the art. Another example is functionalized alumoxanes, such as those described in U.S. Pat. No. 6,322,890, the content of which is incorporated by reference herein.

The amount of filler can be 1 to 60 wt %, for example, 5 to 50 wt %, for example, 10 to 35 wt %, based on the weight of the total curable structural adhesive.

As additional ingredients, the curable structural adhesive also includes, for example, thixotropy agents, such as, for example, aerosils or nanoclays, toughness modifiers, reactive diluents as well as additional ingredients familiar to those skilled in the art.

In an exemplary embodiment, the composition according to the disclosure does not contain a chemical blowing agent or any other agent that would result in foaming of the composition.

In an exemplary embodiment, the curable structural adhesive is a single-component heat-curing epoxy resin composition.

The amount of the curable structural adhesive can be 50 to 95 wt %, for example, 65 to 90 wt %, for example, 70 to 80 wt %, based on the total composition.

The composition according to the disclosure has at least one chemically crosslinked elastomer based on a silane-functional polymer. The chemically crosslinked elastomer can be present in the structural adhesive as an interpenetrating polymer network.

The chemically crosslinked elastomer based on a silane-functional polymer is introduced into the composition in such a way that a silane-functional polymer is mixed with the curable structural adhesive and is then crosslinked in the mixture, for example, so that a penetrating polymer network in the structural adhesive itself is formed.

The amount of chemically crosslinked elastomer based on a silane-functional polymer can be 5 to 50 wt %, for example, 10 to 35 wt %, for example, 20 to 30 wt %, based on the total composition.

For example, a silane-functional polymer P, which can have end groups of formula (V), is suitable as the silane-functional polymer:

$$----R^4-\underset{\underset{(R^3)_a}{|}}{Si}-(OR^5)_{3-a} \quad (V)$$

where the radical $R^3$ stands for a linear or branched, monovalent hydrocarbon radical having 1 to 8 carbon atoms, for example, a methyl or ethyl group.

The $R^4$ radical stands for a linear or branched, divalent hydrocarbon radical with 1 to 12 carbon atoms, optionally containing cyclic and/or aromatic components and optionally having one or more heteroatoms, for example, one or more nitrogen atoms. $R^4$ stands, for example, for a linear or branched alkylene group with 1 to 6 carbon atoms, for example, methylene or 1,3-propylene, for example, 1,3-propylene.

The $R^5$ radical stands for an acyl radical or a linear or branched, monovalent hydrocarbon radical with 1 to 5 carbon atoms, for example, a methyl, ethyl or isopropyl group.

The variable "a" stands for a value of 0 or 1 or 2, for example, a value of 0.

Within a silane group of formula (V), $R^3$ and $R^5$, independently of one another, stand for the radicals described above. Thus, for example, compounds with terminal groups of formula (V) are also possible; these include ethoxydimethoxysilane terminal groups ($R^5$=methyl, $R^5$=methyl, $R^5$=ethyl).

In an exemplary embodiment, the silane-functional polymer P is a silane-functional polyurethane polymer P1, which is obtained by reacting a silane that contains at least one group that is reactive with isocyanate groups with a polyurethane polymer that contains isocyanate groups. This reaction can be carried out in a 1:1 stoichiometric ratio of the groups reactive with isocyanate groups to the isocyanate groups or with a slight excess of groups that are reactive with isocyanate groups, so that the resulting silane-functional polyurethane polymer P1 is entirely free of isocyanate groups.

In the reaction of the silane that has at least one group reactive with isocyanate groups with a polyurethane polymer containing isocyanate groups, the silane may in principle be used in a substoichiometric amount, although this is not preferred in an exemplary embodiment, so this yields a silane-functional polymer containing both silane groups and isocyanate groups.

The silane which contains at least one group that is reactive with isocyanate groups is, for example, a mercaptosilane or an aminosilane, for example, an aminosilane.

The aminosilane can be an aminosilane AS of formula (VI)

(VI)

where $R^3$, $R^4$, $R^5$ and a have already been described and $R^7$ stands for a hydrogen atom or a linear or branched monovalent hydrocarbon radical with 1 to 20 carbon atoms, optionally containing cyclic components, or for a radical of formula (VII)

(VII)

where the $R^8$ and $R^9$ radicals, independently of one another, stand for a hydrogen atom or a radical selected from $—R^{11}$, $—COOR^{11}$ and $—CN$.

The radical $R^{10}$ stands for a hydrogen atom or a radical selected from $—CH_2—COOR^{11}$, $—COOR^{11}$, $—CONHR^{11}$, $—CON(R^{11})_2$, $—CN$, $—NO_2$, $—PO(OR^{11})_2$, $—SO_2R^{11}$ and $—SO_2OR_{11}$.

The radical $R^{11}$ stands for a hydrogen radical having 1 to 20 carbon atoms, optionally with at least one heteroatom.

Examples of suitable aminosilanes AS include primary aminosilanes, such as 3-aminopropyltrimethoxysilane, 3-aminopropyl dimethoxysilane; secondary aminosilanes such as N-butyl-3-aminopropyl trimethoxysilane, N-phenyl-3-aminopropyl trimethoxysilane; the products of Michael-type addition of primary aminosilanes, such as 3-aminopropyl trimethoxysilane or 3-aminopropyldimethoxy methylsilane onto Michael acceptors, such as acrylonitrile, (meth)acrylic acid esters, (meth)acrylic acid amides, maleic acid and fumaric acid diesters, citraconic acid diesters and itaconic acid diesters, for example, N-(3-trimethoxy-silylpropyl)aminosuccinic acid dimethyl and diethyl esters as well as analogs of the aminosilanes mentioned above with ethoxy groups or isopropoxy groups instead of the methoxy groups on the silicon. Exemplary aminosilanes AS include secondary aminosilanes, for example, aminosilanes AS, in which $R^7$ in formula (VI) is different from H. The Michael-type adducts, for example, N-(3-trimethoxysilyl-propyl)aminosuccinic acid diethyl ester, are exemplary.

The term "Michael acceptor" in the present document refers to compounds, which, because of the double bonds they contain that have been activated by electron acceptor radicals, are capable of entering into nucleophilic addition reactions (hetero-Michael addition) with primary amino groups in a manner similar to that with Michael addition.

Polymers which can be obtained by reacting at least one polyol with at least one polyisocyanate, for example, a diisocyanate, are suitable as the isocyanate group-containing polyurethane polymer for producing a silane-functional polyurethane polymer P1. This reaction may take place due to the fact that the polyol and the polyisocyanate are brought to reaction by the usual methods at temperatures of 50° C. to 100° C., for example, optionally with the involvement of suitable catalysts, wherein the polyisocyanate is dosed in such a manner that its isocyanate groups are present in a stoichiometric excess in relation to the hydroxyl groups of the polyol.

For example, the excess of polyisocyanate can be selected so that a free isocyanate group content of 0.1 to 5 wt %, for example, 0.1 to 2.5 wt %, for example, 0.2 wt % to 1 wt %, based on the total polymer, remains in the resulting polyurethane polymer after the reaction of all the hydroxyl groups of the polyol.

The polyurethane polymer may optionally be produced with the joint use of plasticizers, wherein the plasticizers used do not contain any groups that are reactive with isocyanates.

Polyurethane polymers with the aforementioned free isocyanate group content obtained from the reaction of diisocyanates with high-molecular diols in an NCO:OH ratio of 1.5:1 to 2.2:1 are exemplary.

Suitable polyols for the synthesis of the polyurethane polymer include, for example, polyether polyols, polyester polyols and polycarbonate polyols as well as mixtures of these polyols.

Polyether polyols, also known as polyoxyalkylene polyols or oligoetherols that are suitable, for example, include those which are the polymerization products of ethylene oxide, 1,2-propylene oxide, 1,2- or 2,3-butylene oxide, oxetane, tetrahydrofuran or mixtures thereof, optionally polymerized with the help of an initiator molecule having two or more active hydrogen atoms such as, for example, water, ammonia or compounds having multiple OH or NH groups, such as, for example, 1,2-ethane diol, 1,2- and 1,3-propane diol, neopentyl glycol, diethylene glycol, triethylene glycol, the isomeric dipropylene glycols and tripropylene glycols, the isomeric butane diols, pentane diols, hexane diols, heptane diols, octane diols, nonane diols, decane diols, undecane diols, 1,3- and 1,4-cyclohexane dimethanol, bisphenol A, hydrogenated bisphenol A, 1,1,1-trimethylolethane, 1,1,1-trimethylolpropane, glycerol, aniline as well as mixtures of the aforementioned compounds. Polyoxyalkylene polyols, which have a low degree of unsaturation (measured according to ASTM D-2849-69 and expressed in milliequivalents of unsaturation per gram of polyol (mEq/g)) may also be used, synthesized with the help of double metal cyanide complex catalysts (DMC catalysts), for example, as well as polyoxyalkylene polyols with a higher degree of unsaturation, synthesized with the help of anionic catalysts such as NaOH, KOH, CsOH or alkali alcoholates, for example.

Exemplary are polyoxyethylene polyols and polyoxypropylene polyols, for example, polyoxyethylenediols, polyoxypropylenediols, polyoxyethylenetriols and polyoxypropylenetriols.

Exemplary are polyoxyalkylene diols or polyoxyalkylene triols with a degree of unsaturation lower than 0.02 mEq/g and with a molecular weight in the range of 1000 to 30,000 g/mol as well as polyoxyethylene diols, polyoxyethylene triols, polyoxypropylene diols and polyoxypropylene triols with a molecular weight of 400 to 20,000 g/mol.

Also suitable are so-called ethylene oxide-terminated ("EO-endcapped," ethylene oxide-endcapped) polyoxypropylene polyols. The latter are special polyoxypropylene polyoxyethylene polyols which are obtained, for example, by further alkoxylating pure polyoxypropylene polyols, for example, polyoxypropylene diols and triols, with ethylene oxide after conclusion of the polypropoxylationreaction, and therefore having primary hydroxyl groups. In this case, polyoxypropylene polyoxyethylene diols and polyoxypropylene polyoxyethylene triols are exemplary.

Also suitable are hydroxyl group-terminated polybutadiene polyols such as, for example, those synthesized by polymerization of 1,3-butadiene and allyl alcohol or by oxidation of polybutadiene as well as their hydrogenation products.

Also suitable are styrene-acrylonitrile-grafted polyether polyols such as those available commercially under the brand names Lupranol® from the company Elastogran GmbH, Germany.

Suitable polyester polyols include, for example, polyesters having at least two hydroxyl groups and synthesized by known methods, for example, by polycondensation of hydroxycarboxylic acids or polycondensation of aliphatic and/or aromatic polycarboxylic acids with divalent or polyvalent alcohols.

Suitable, for example, are the polyester polyols synthesized from divalent to trivalent alcohols such as, for example, 1,2-ethane diol, diethylene glycol, 1,2-propane diol, dipropylene glycol, 1,4-butane diol, 1,5-pentane diol, 1,6-hexane diol, neopentyl glycol, glycerol, 1,1,1-trimethylolpropane or mixtures of the aforementioned alcohols with organic dicarboxylic acids or their anhydrides or esters such as, for example, succinic acid, glutaric acid, adipic acid, trimethyladipic acid, suberic acid, azelaic acid, sebacic acid, dodecane dicarboxylic acid, maleic acid, fumaric acid, dimer fatty acid, phthalic acid, phthalic acid anhydride, isophthalic acid, terephthalic acid, dimethylterephthalate, hexahydrophthalic acid, trimellitic acid and trimellitic acid anhydride or mixtures of the aforementioned acids as well as polyester polyols from lactones such as ε-caprolactone, for example.

Exemplary are polyester diols, for example, those synthesized from adipic acid, azelaic acid, sebacic acid, dodecane dicarboxylic acid, dimer fatty acid, phthalic acid, isophthalic acid and terephthalic acid as the dicarboxylic acid or from lactones such as, for example, ε-caprolactone and from ethylene glycol, diethylene glycol, neopentyl glycol, 1,4-butane diol, 1,6-hexane diol, dimer fatty acid diol and 1,4-cyclohexanedimethanol as the divalent alcohol.

Suitable polycarbonate polyols include, for example, those accessible by reaction of the aforementioned alcohols that are used for synthesis of the polyester polyols with dialkyl carbonates such as dimethyl carbonate, diaryl carbonates such as diphenyl carbonate or phosgene. Exemplary are polycarbonate diols, for example, amorphous polycarbonate diols.

Other suitable polyols include poly(meth)acrylate polyols.

Also suitable are polyhydroxy-functional fats and oils, for example, natural fats and oils, for example, castor oil or polyols obtained by chemical modification of natural fats and oils, so-called oleochemical polyols, the epoxy polyesters and/or epoxy polyethers obtained, for example, by epoxidation of unsaturated oils and subsequent ring-opening with carboxylic acids and/or alcohols or polyols obtained by hydroformylation and hydrogenation of unsaturated oils. Also suitable polyols obtained from natural fats and oils by degradation processes such as alcoholysis or ozonolysis and subsequent chemical linkage, for example, by transesterification or dimerization of the degradation products or derivatives thereby obtained. Suitable degradation products of natural fats and oils include, for example, fatty acids and fatty alcohols as well as fatty acid esters, for example, the methyl esters (FAME) which can be derivatized, for example, by hydroformylation and hydrogenation, to yield hydroxy fatty acid esters.

Also suitable are polyhydrocarbon polyols also known as oligohydrocarbonols, for example, polyhydroxy-functional ethylene-propylene, ethylene-butylene or ethylene-propylene-diene copolymers, such as those produced, for example, by the company Kraton Polymers, USA or polyhydroxy-functional copolymers of dienes such as 1,3-butadiene or diene mixtures and vinyl monomers such as styrene, acrylonitrile or isobutylene or polyhydroxy-functional polybutadiene polyols, for example, those that are produced by copolymerization of 1,3-butadiene and allyl alcohol and may also be hydrogenated.

Also suitable are polyhydroxy-functional acrylonitrile/butadiene copolymers such as those that can be produced from epoxies or amino alcohols and carboxyl-terminated acrylonitrile/butadiene copolymers, which are commercially available under the brand names Hypro® CTBM from the company Emerald Performance Materials LLC, USA.

The polyols mentioned above can have an average molecular weight of 250 to 30,000 g/mol, for example, from 1000 to 30,000 g/mol and an average OH functionality in the range of 1.6 to 3.

Suitable polyols include polyester polyols and polyether polyols, for example, polyoxyethylene polyol, polyoxypropylene polyol and polyoxypropylene polyoxyethylene polyol, for example, polyoxyethylene diol, polyoxypropylene diol, polyoxyethylene triol, polyoxypropylene triol, polyoxypropylene polyoxyethylene diol and polyoxypropylene polyoxyethylene triol.

In addition to the aforementioned polyols, small amounts of low-molecular divalent or polyvalent alcohols may also be used, such as 1,2-ethanediol, 1,2- and 1,3-propanediol, neopentyl glycol, diethylene glycol, triethylene glycol, the isomeric dipropylene glycols and tripropylene glycols, the isomeric butane diols, pentane diols, hexane diols, heptane diols, octane diols, nonane diols, decane diols, undecane diols, 1,3- and 1,4-cyclohexane dimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher valency alcohols, low-molecular alkoxylation products of the aforementioned divalent and polyvalent alcohols as well as mixtures of the alcohols mentioned above in the production of the polyurethane polymers containing terminal isocyanate groups.

To adjust the OH functionality of the polyols, monovalent alcohols (monools) may also be used, for example, butanol, 2-ethylhexanol or an alcohol-initiated polyoxyalkylene monool.

Suitable commercial polyisocyanates, for example, diisocyanates may be used as the polyisocyanates for synthesis of the polyurethane polymer. Suitable diisocyanates include, for example, hexamethylene 1,6-diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine and lysine esterdiisocyanate, cyclohexane1,3-diisocyanate, cyclohexane-1,4-diisocyanate, 1-isocyanato-3,3,5-trimethyl-5-isocyanatomethylcyclohexane (isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3-xylylene diisocyanate, m- and p-tetramethyl-1,4-xylylene diiso- cyanate, bis-(1-isocyanato-1-methylethyl)naphthalene, 2,4- and 2,6-toluylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), oligomers and polymers of the aforementioned polyisocyanates as well as any mixtures of the aforementioned polyisocyanates.

Suitable polyisocyanates include HDI, TMDI, IPDI, TDI as well as MDI, for example, IPDI.

Suitable silane-functional polymers P1 are commercially available, for example, under the brand names Polymer ST, e.g., Polymer ST50 from the company Hanse Chemie AG, Germany as well as under the brand name Desmoseal from the company Bayer MaterialScience AG, Germany.

In a second exemplary embodiment, the silane-functional polymer P is a silane-functional polyurethane polymer P2 that can be obtained by reaction of an isocyanatosilane IS with a polymer that contains functional end groups, for example, hydroxyl groups, mercapto groups and/or amino groups that are reactive with isocyanate groups. This reaction takes place at a 1:1 stoichiometric ratio of isocyanate groups to functional end groups that are reactive with isocyanate groups or with a slight excess of the end groups that are reactive with the isocyanate groups, for example, at temperatures of 20° C. to 100° C., optionally with concurrent use of catalysts.

Suitable isocyanatosilane IS compounds includes those of formula (VIII)

(VIII)

where $R^3$, $R^5$, $R^4$ and "a" were already described above.

Examples of suitable isocyanatosilanes IS of formula (VIII) include isocyanatomethyl trimethoxysilane, isocyanatomethyldimethoxy methylsilane, 3-isocyanatopropyl trimethoxysilane, 3-isocyanatopropyldimethoxy methylsilane and their analogs with ethoxy or isopropoxy groups instead of methoxy groups on the silicon.

Polymers having similar hydroxyl groups may include, on the one hand, the polyols already mentioned above, for example, high-molecular polyoxyalkylene polyols, for example, polyoxypropylene diols with a degree of unsaturation of less than 0.02 mEq/g and with a molecular weight in the range of 2000 to 30,000 g/mol, for example, those with a molecular weight in the range of 4000 to 30,000 g/mol.

On the other hand, polyurethane polymers having hydroxyl groups, for example, those with terminal hydroxyl groups are suitable for reaction with isocyanatosilanes IS of formula (VIII). Such polyurethane polymers are available by reacting at least one polyisocyanate with at least one polyol. This reaction may take place by reacting the polyol and the polyisocyanate by the usual methods, for example, at temperatures of 50° C. to 100° C., optionally with the concurrent use of suitable catalysts, wherein the polyol is dosed in such a way that its hydroxyl groups are present in a stoichiometric excess in relation to the isocyanate groups of the polyisocyanate. A ratio of hydroxyl groups to isocyanate groups of 1.3:1 to 4:1, for example, 1.8:1 to 3:1 is exemplary.

The polyurethane polymer may optionally be synthesized by concurrent use of plasticizers, wherein the plasticizers used do not contain any groups that are reactive with isocyanates.

The same polyols and polyisocyanates that were already mentioned as suitable for synthesis of a polyurethane polymer containing isocyanate groups and used for synthesis of a silane-functional polyurethane polymer P1 are also suitable for this reaction.

Suitable silane functional polymers P2, for example, are available commercially under the brand names SPUR+® 1010LM, 1015LM and 1050MM from the company Momentive Performance Materials Inc., USA as well as being available under the brand names Geniosil® STP-E15, STP-10 and STP-E35 from the company Wacker Chemie AG, Germany.

In a third exemplary embodiment, the silane-functional polymer P is a silane-functional polymer P3 that is available by a hydrosilylation reaction of polymers with terminal double bonds, for example, polymethacrylate polymers or polyether polymers, for example, allyl-terminated polyoxyalkylene polymers described, for example, in U.S. Pat. No. 3,971,751 and U.S. Pat. No. 6,207,766, the full disclosed contents of which is incorporated by reference herein.

For example, suitable silane-functional polymers P3 are also commercially available under the brand names MS Polymer™ S203H, S303H, S227, S810, MA903 and S943, Silyl™ SAX220, SAX350, SAX400 and SAX725, Silyl™ SAT350 and SAT400 as well as XMAP™ SA100S and SA310S from the company Kaneka Corp., Japan as well as under the brand names Excestar® S2410, S2420, S3430, S3630, W2450 and MSX931 from the company Asahi Glass Co., Ltd., Japan.

Exemplary silane-functional polymers P include silane-functional polymers P1 and silane-functional polyurethane polymers P3.

The silane-functional polymer P can be used in an amount from 5 to 50 wt %, for example, in an amount from 10 to 35 wt %, for example, 20 to 30 wt %, based on the total composition.

The composition according to the disclosure can be obtained by mixing at least one curable structural adhesive with at least one silane-functional polymer, and crosslinking the silane-functional polymer in the mixture to form an elastomer wherein the silane-functional polymer is crosslinked by reaction of the silane groups with water, for example.

In synthesis of the composition according to the disclosure, the curable structural adhesive is mixed with the silane-functional polymer, for example, until obtaining a homogeneous mixture. If the curable structural adhesive as epoxy resin A comprises a solid epoxy resin, the mixing is performed at a temperature above the glass transition temperature $T_g$ of the solid epoxy resin.

If the curable structural adhesive is a heat-curing epoxy resin composition, it may be mixed with the silane-functional polymer before adding the curing agent B.

The temperature in mixing may therefore be adjusted up to or even above the curing temperature of the heat-curing epoxy resin composition without resulting in curing of the structural adhesive. A more efficient mixing is usually achieved at higher temperatures.

After obtaining, for example, a homogeneous mixture, the silane-functional polymer is crosslinked. The elastomer thereby formed is present, for example, as an interpenetrating polymer network in the structural adhesive.

The silane-functional polymer can be crosslinked by reaction of the silane groups with water.

The water for the crosslinking of the silane-functional polymer may be introduced into the composition in a variety of ways. On the one hand, the composition may be left to stand under atmospheric conditions after mixing the curable structural adhesive with the silane-functional polymer, so that water in the form of atmospheric humidity enters the composition and leads to the crosslinking of the silane-functional polymer.

On the other hand, water in free or bound form may be added to the composition when mixing the curable structural adhesive with the silane-functional polymer. Water in bound form is usually bound to a support material or is added, for example, in the form of an aqueous plastic dispersion.

For crosslinking the silane-functional polymer with water, the composition contains, for example, at least one catalyst. Such catalysts include, for example, organotin compounds, for example, dibutyltin dilaurate, dioctyltin dilaurate, dibutyltin diacetylacetonate and dioctyltin diacetylacetonate; titanates and zirconates, for example, tetraisobutoxytitanate and diisobutoxytitanium bis-(ethylacetoacetate); nitrogen compounds, for example, tertiary amines, for example, N,N-dimethylbenzylamine, N,N-dimethylcyclohexylamine and 1,4-diazabicyclo[2.2.2]octane and amidines and guanidines, for example, 1,8-diazabicyclo[5.4.0]undec-7-ene and 1,1,3,3-tetramethylguanidine as well as mixtures of the aforementioned catalysts.

It can be beneficial for the composition according to the disclosure to be embodied as a shape memory material which has the greatest possible dimensional stability in the temporary shape and also has the most complete possible resilience. For example, this means that the composition according to the disclosure is capable of remaining in the temporary shape for the longest possible period of time, for example, for more than 6 months, and that the composition can be returned completely to its original shape as needed, by heating it to a temperature above the glass transition temperature $T_g$ of the composition. A sufficient resilience can be achieved when a test sample made of a composition according to the disclosure and having a height in the range of 5 to 10 mm undergoes height deformation of up to 50% and can be restored back to 60 to 100% of the original height as needed.

Another exemplary aspect the disclosure relates to a molded body which has been subjected to a reversal shaping, wherein the shaping comprises:

heating a composition as described above to a temperature above its glass transition temperature $T_g$;

shaping the composition under the tension of the chemically crosslinked elastomer based on the silane-functional polymer; and cooling the shaped composition to a temperature below its glass transition temperature $T_g$.

Figure 1:
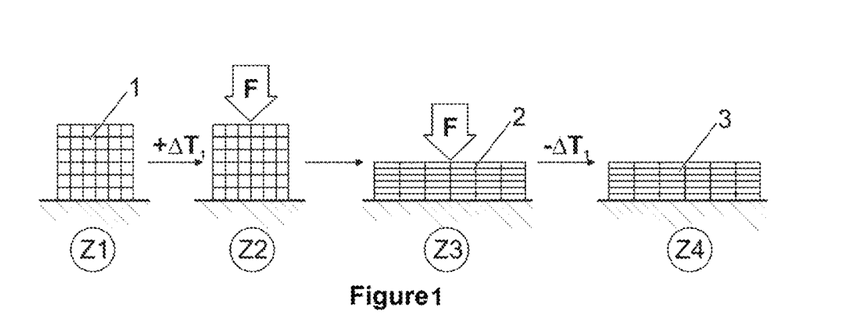
FIG. 1 shows a schematic diagram of the production of a molded body and/or a composition in its temporary shape, according to an exemplary aspect.

FIG. 1 shows schematically the production of an exemplary molded body from a composition based on an epoxy resin composition as described above.

The solid composition 1 in its starting condition Z1 is in the original shape in which it was present, for example, at the time of its production. In a first step, the composition is then heated by a temperature $\Delta T_1$ to a temperature above its glass transition temperature $T_g$, but in the case of a heat-curing epoxy resin composition, it is heated to a temperature below its curing point. If the composition is in this condition Z2, it is converted to its temporary shape 2 while still shapeable under the influence of a force F. In this temporary shape, the chemically crosslinked elastomer, based on a silane-functional polymer, is present in a form under tension, such as that illustrated in condition Z3. The composition is kept in this temporary shape and the temperature of the composition is again reduced by the temperature $\Delta T_1$ to a temperature, which is below its glass transition temperature $T_g$, during which the composition solidifies and is then solid in its temporary shape 3, as illustrated in the condition Z4. As a molded body in this condition, the composition is stable in storage and can be processed further. The molded body can thus be punched or cut and/or applied to a support, for example, or arranged in a cavity of a structural component to be reinforced.

The shaping of the composition according to the disclosure, in which it is brought into its temporary shape, can take place by pressing, rolling, drawing and the like. In shaping, the composition can be cooled in its shaped state to a temperature below its glass transition temperature $T_g$, so that it will persist in its temporary shape.

In another exemplary aspect, the present disclosure relates to a reinforcing element for reinforcement of structural components in cavities, comprising a support to which a molded body is attached according to the preceding description.

This support may be made of any materials. For example, the support is made of a plastic, a metal or a combination of plastic and metal.

Exemplary plastics include polyurethanes, polyamides, polyesters and polyolefins as well as polyolefin copolymers, for example, high temperature-resistant polymers such as poly (phenylene ethers), polysulfones or polyether sulfones. Exemplary plastics are polyamides (PA) such as PA6 or PA66, polyethylene and polypropylene as well as polystyrene and copolymers such as acrylonitrile-butadiene-styrene (ABS). Exemplary metals include aluminum, steel, nickel and alloys of these metals. The metal may be used in untreated form or it may be pretreated with suitable agents, for example, to prevent corrosion or to improve adhesion.

The support may also have any desired design and any structure. For example, it may be solid, hollow or foamed or may have a lattice-type structure. The surface of the support may typically be smooth, rough or structured.

The support may contribute to the structural reinforcement or to the sealing of the component or to noise abatement in addition to its function as a support for the composition according to the disclosure and/or the molding produced from it.

The support may also have at least one fastening means, for example, a clip for fastening and placement of the reinforcing element in a cavity. The fastening of the reinforcing element with a clip is suitable, for example, for applications in which the entire surface of the component, i.e., the interior wall of the cavity must be reachable for immersion coating, for example. In such cases, fastening by bonding is not suitable, for example, because the coating cannot reach the bonding site.

The support can be made of a plastic which is coated with a metal. The materials described above can be used as the plastic and as the metal.

The metal with which the plastic is coated may be secured on the plastic in any desired way. For example, the fastening may be accomplished through the use of mechanical fastening means such as nails, screws, rivets, mechanical clips, clamps, flanges and the like or by adhesive bonding of the metal to the plastic. In addition, the metal may also be applied to the plastic by means of plastic galvanization. For example, the layer thickness of the metal layer on the plastic support is 0.03 to 1.5 mm.

The support made of plastic coated with a metal can have the advantage in comparison with a pure metal support that it is lighter on the one hand while on the other hand its mechanical properties and design can be varied in a wide range due to the properties of the plastic such as the choice of the material and its processing. The advantage of the metal coating in comparison with a pure plastic support is that the metals are usually gentler on the skin. Another advantage of the metal coating is that in the case of heat-curing structural adhesives, the metal layer can be heated very locally and efficiently by induction.

Figure 2:
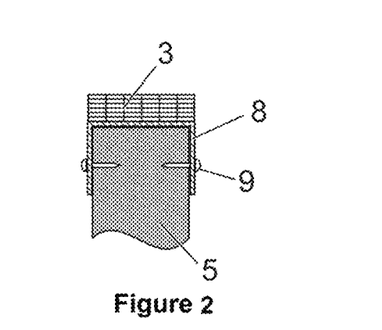
FIG. 2 shows a schematic diagram of reinforcing elements, according to an exemplary aspect.

FIG. 2 shows a support 5 made of a plastic coated with a metal 8. The metal is attached to the support with nails 9. A molded body 3 including a composition according to the disclosure in its temporary condition is provided on the metal layer.

Figure 3:
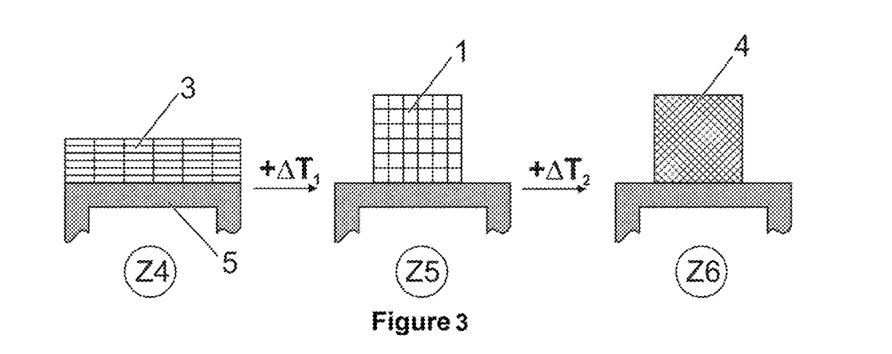
FIG. 3 shows a schematic diagram of the shape change and curing of the composition, according to an exemplary aspect.

FIG. 3 shows schematically a reinforcing element including a support 5 to which a molded body 3 is applied in its starting condition Z4, in the form of a composition according to the disclosure with a heat-curing epoxy resin composition as the structural adhesive and chemically crosslinked elastomer based on a silane-functional polymer in its temporary shape. In a first step, the molded body 3 may then be heated by a temperature $\Delta T_1$ to a temperature above the glass transition temperature $T_g$ of the composition wherein the elastomer based on a silane-functional polymer is relaxed, leading to a deformation of the molded body and/or the composition 1 back to its original shape. This corresponds to the condition Z5 in FIG. 3. The temperature is next raised by $\Delta T_2$ to a temperature at which the composition and/or the curable structural adhesive cures. The fully cured composition 4 is shown in the condition Z6.

The increase in temperature leading to the shaping of the molded body and the increase in temperature for curing the structural adhesive need not necessarily take place in two steps. It is quite possible for the two steps to take place one after the other due to a steady increase in temperature.

In addition, disclosed is the use of a reinforcing element such as that described above for reinforcing structural components in cavities. Such structural components can be used in automotive bodies and/or frames of shipping and transportation means, for example, vehicles on water or land or aircraft. For example, disclosed is the use of a reinforcing element in automotive bodies or frames of automobiles, trucks, railroad cars, boats, ships, helicopters and aircraft, for example, in automobiles.

Another exemplary embodiment relates to a method for reinforcing structural components in cavities, comprising:

Placing a reinforcing element according to the preceding description in the cavities of a structural component;

heating the molded body 3 on the reinforcing element to a temperature above the glass transition temperature $T_g$ of the composition so that the molded body returns to its shape prior to the shaping, i.e., to its original shape;

curing the curable structural adhesive.

In an exemplary embodiment of the method described here for reinforcement of structural components in cavities, the support of the reinforcing element includes an induction heatable metal or a material coated with an induction-heatable metal and with the provision that the curable structural adhesive is a heat-curing structural adhesive, the steps b' and c' are induced by induction, i.e., by an electromagnetic alternating field of an induction coil.

Figure 4:
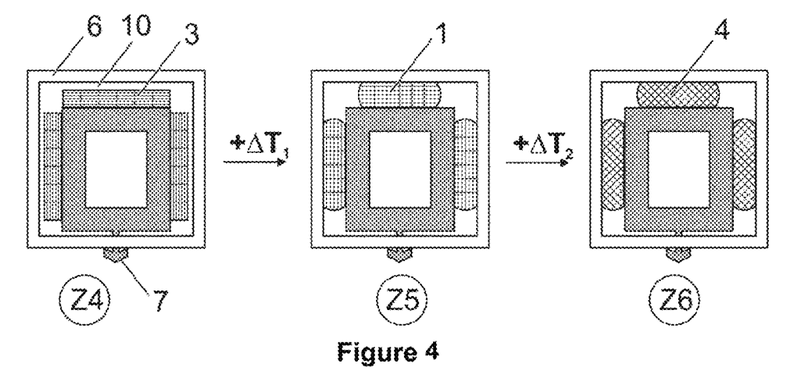
FIG. 4 shows a schematic diagram of the reinforcement of a cavity of a structural component, according to an exemplary aspect.

Like FIG. 3, FIG. 4 shows schematically the reinforcement in a cavity of a structural component 6 to which is applied a reinforcing element including a support 5 and multiple molded bodies 3 of a composition according to the disclosure with a heat-curable structural adhesive and chemically crosslinked elastomer based on a silane-functional polymer in its temporary shape. The support of the reinforcing element is attached to the structural component with a clip 7. The molded body and/or the composition is/are in a temporary shape (condition Z4) and are then heated by a temperature $\Delta T_1$ to a temperature above the glass transition temperature $T_g$ of the composition. In doing so, the elastomer based on a silane functional polymer relaxes, leading to deformation of the molded body and/or the composition 1 into its original shape, so that the gap 10 remaining open between the reinforcing element and the cavity is closed and the composition according to the disclosure adheres to the inside wall of the cavity (condition Z5). After a further increase in temperature by a temperature $\Delta T_2$, the heat-curing structural adhesive cures. FIG. 4 (condition Z6) shows the reinforced structural component with the fully cured composition 4.

Figure 5:
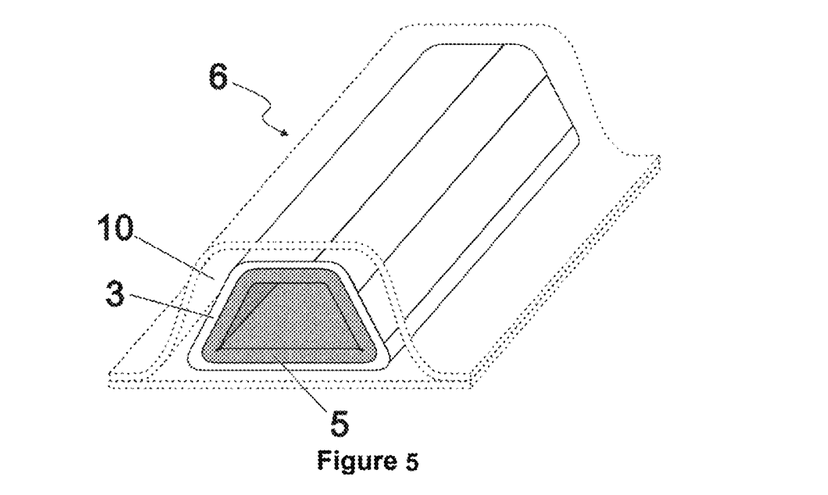
FIG. 5 shows a schematic diagram of a reinforcing element in a cavity of a structural component, according to an exemplary aspect.

FIG. 5 shows a reinforcing element such as that used in a cavity 10 of a structural component 6 before the deformation of the molded body and/or the composition according to the disclosure in its temporary shape 3 which is situated on a support 5.

Figure 6:
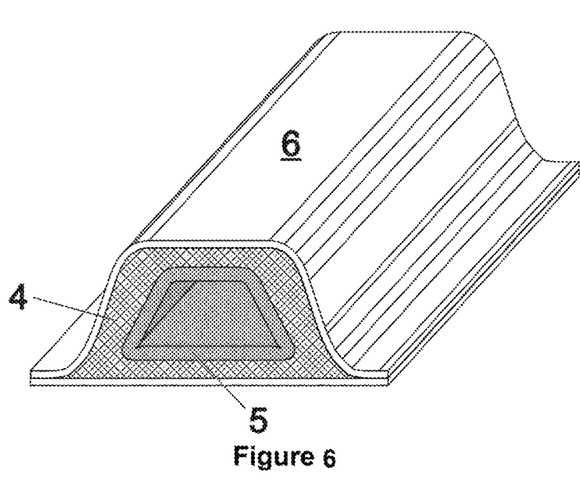
FIG. 6 shows a schematic diagram of a reinforced structural component, according to an exemplary aspect.

FIG. 6 shows the reinforcing element from FIG. 5 as used in a cavity of a structural component 6, wherein the molded part and/or the composition according to the disclosure in this case has already returned to its original shape and adheres to the inside walls of the structural component 6. Furthermore, FIG. 6 shows the fully cured composition 4.

The shape and structure of the exemplary reinforcing elements may be selected as desired in accordance with where they will be used.

In addition, the present disclosure relates to a cured composition such as that obtained by a curing process, for example, by a heat treatment from a composition such as those described above.

Examples

Exemplary embodiments which illustrate the present disclosure in greater detail are described below. The disclosure is not limited to the exemplary embodiments described here.

Test Methods

The dimensional stability of the material in the temporary shape was determined during 7 days under a standard climate (23° C./50% atmospheric humidity) ("relaxation"), and the resilience to the originals shape was determined after 7 days of storage under a standard climate. The dimensions of the original shape of the sample bodies are 10×10×6 mm (L×W×H). The height in the original form ($H_0$) was thus 6 mm. The test bodies were converted to the temporary shape with a height of 3 mm ($H_{Temp}$) by pressing at an elevated temperature and then cooling, corresponding to a compression of 50%, which thus allows a height gain of 100% in the restoring operation.

Relaxation is defined here as:

$$\text{Relaxation}(\%) = \frac{H_{Temp}(\text{day } 7) - H_{Temp}(\text{day } 0)}{H_{Temp}(\text{day } 0)} \cdot 100$$

The resilience is determined as:

$$\text{Resilience}(\%) = \frac{H_0(\text{day } 7, \text{ after curing}) - H_{Temp}(\text{day } 7)}{H_0(\text{day } 0) - H_{Temp}(\text{day } 0)} \cdot 100$$

Synthesis of N-(3-trimethoxysilylpropyl)aminosuccinic acid diethyl ester

While stirring well in the absence of moisture, 172 g (1 mol) maleic acid diethyl ester was added by drops to 179 g (1 mol) 3-aminopropyl trimethoxysilane (Silquest® A-1110 from Momentive Performance Materials) and then stirring was continued for 2 hours, yielding a colorless liquid with a viscosity of 60 mPas at 20° C.

Synthesis of Silane-Functional Polymer P1

In the absence of moisture, 1000 g Polyol Acclaim® 12200 (from Bayer; low monool polyoxypropylene diol, OH number 11.0 mg KOH/g, water content approx. 0.02 wt %), 43.6 g isophorone diisocyanate (Vestanat® IPDI from Degussa) and 0.12 g dibutyltin dilaurate were heated to 90° C. while stirring steadily and left at this temperature until the free isocyanate group content, as determined by titration, had reached a value of 0.7 wt %.

Next, 62.3 g N-(3-trimethoxysilylpropyl)aminosuccinic acid diethyl ester was mixed in and the mixture was stirred at 90° C. until no more free isocyanate could be detected by FT-IR spectroscopy. The silane-functional polyurethane polymer was cooled to room temperature and stored in the absence of moisture.

Production of the Test Bodies

Referring to Table 1, the formulations 1 through 7 were produced by means of a co-rotating twin-screw extruder at a melting point of 90° C. by mixing the ingredients according to Table 1 in the corresponding weight amounts by percent.

The formulations produced in this way were then processed to form sheets 6 mm thick. Next, the respective silane-functional polymer was chemically crosslinked for at least 1 week at room temperature and 50% atmospheric humidity. Test bodies in their original shape with the dimensions 10×10×6 mm were then cut from the sheets.

TABLE 1

Formulations 1 through 7 in wt % as well as results

| | 1 | 2 | 3 | 4 | 5 | 6 | 7 |
|---|---|---|---|---|---|---|---|
| Araldite ® GT 7004[a] | 62.9 | 46.7 | 62.9 | 46.7 | 60.4 | 50.3 | 46.7 |
| Dicyanodiamide | 1.4 | 1.1 | 1.4 | 1.1 | 1.4 | 1.1 | 1.1 |
| MS S203H[b] | 31.5 | 46.8 | | | | | |
| MS S303H[b] | | | 31.5 | 46.8 | | | |
| SAX 260[b] | | | | | 30.1 | 40.1 | |
| P1 | | | | | | | 46.8 |
| Metatin ® K740[c] | 1.13 | 1.13 | 1.13 | 1.13 | 1.13 | 1.13 | 1.13 |
| DBU[d] | 0.57 | 0.57 | 0.57 | 0.57 | 0.57 | 0.57 | 0.57 |
| Purmol ® 13[e] | 1.6 | 2.3 | 1.6 | 2.3 | 1.6 | 2 | 2.3 |
| Aerosil ®[f] | 0.9 | 1.4 | 0.9 | 1.4 | | | 1.4 |
| HDK ® H18[f] | | | | | 4.8 | 4.8 | |
| Relaxation (%) | 0 | 0 | 0 | 0 | 0 | 0 | 0 |
| Resilience (%) | 97 | 98 | 67 | 95 | 65 | 71 | 95 |

[a]obtainable from Huntsman Advanced Materials
[b]obtainable from Kaneka Corp
[c]10% solution in DIDP, obtainable from Rohm & Haas
[d]1,8-diazabicyclo[5.4.0]undec-7-ene, 50% in DIDP, obtainable from Fluka
[e]obtainable from Zeochem AG
[f]pyrogenic silicic acid, obtainable from Wacker Chemie AG It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS

1 Composition in the original shape
2 Composition (deformable)
3 Molded body (temporary shape)
4 Fully hardened composition
5 Support
6 Structural component
7 Clip
8 Metal layer
9 Nail
10 Gap
Z1 Condition of the composition in the original shape
Z2 Condition of the deformable composition
Z3 Condition of the composition in the temporary condition (molded body)
Z4 Condition of the fully hardened composition
$\Delta T_1$ Difference in temperature of the composition between the temperature below $T_g$ and the temperature of the composition above $T_g$.
$\Delta T_2$ Difference in temperature between the temperature of the composition above $T_g$ and the curing temperature of the composition.

What is claimed is:

1. A composition, comprising:
   at least one curable structural adhesive; and
   at least one chemically crosslinked elastomer formed a silane-functional polymer; wherein the chemically crosslinked elastomer is present as an interpenetrating polymer network in the structural adhesive; where the curable structural adhesive is a heat-curing epoxy resin composition, comprising at least one epoxy resin A and at least one curing agent B for epoxy resins which is activated by elevated temperature; and wherein the amount of curable structural adhesive is 50 to 95 wt %, and the amount of chemically crosslinked elastomer based on a silane-functional polymer is 5 to 50 wt %, each based on the total composition.

2. The composition according to claim 1, wherein the silane-functional polymer is obtained by:
   a reaction of a silane which has at least one group that is reactive with isocyanate groups, with a polyurethane polymer containing isocyanate groups;
   a reaction of an isocyanatosilane with a polymer that has functional end groups that are reactive with isocyanate groups; or
   a hydrosilylation reaction of polymers having terminal double bonds.

3. The composition according to claim 1, wherein the epoxy resin A comprises a compound represented by formula (I):

wherein R¹ and R², independently of one another, represent H or CH₃; s is in a range of ≥1.

4. The composition according to claim 3, wherein the epoxy resin A further comprises a liquid epoxy resin.

5. The composition according to claim 4, wherein the liquid epoxy resin comprises a compound represented by formula (II):

wherein R¹ and R², independently of one another, represents H or CH₃; and r is in a range of from 0 to 1.

6. The composition according to claim 1, wherein the epoxy resin A comprises a compound represented by formula (III):

wherein X stands for a hydrogen atom or a methyl group; Y stands for —CH₂— or a radical of formula (IV):

wherein z is in a range of from 0 to 7.

7. The composition according to claim 1, wherein the composition is obtained by a process comprising:
  mixing at least one curable structural adhesive with at least one silane-functional polymer; and
  crosslinking of the silane-functional polymer in the mixture to form an elastomer.

8. The composition according to claim 7, wherein the silane-functional polymer is crosslinked by reaction of the silane groups with water.

9. A method of producing a composition according to claim 1, the method comprising:
  mixing the curable structural adhesive with a silane-functional polymer; and
  crosslinking the silane-functional polymer in the mixture to form an elastomer.

10. The method according to claim 9, wherein the crosslinking of the silane-functional polymer is performed by reaction of the silane groups with water.

11. A molded body, wherein the molded body is formed from a process comprising:
  heating a composition according to claim 1 to a temperature above its glass transition temperature $T_g$;
  shaping the composition under the tension of the chemically crosslinked elastomer based on a silane-functional polymer; and
  cooling the shaped composition to a temperature below its glass transition temperature $T_g$.

12. A reinforcing agent for reinforcing structural components in cavities, comprising a support and the molded body according to claim 11, wherein the molded body is applied to the support.

13. The reinforcing agent according to claim 12, wherein the support is made of a plastic coated with a metal.

14. The composition according to claim 1, wherein the silane-functional polymer has an end group represented by formula (V):

wherein $R^3$ represents a linear or branched, monovalent hydrocarbon radical having 1 to 8 carbon atoms; $R^4$ represents a linear or branched, divalent hydrocarbon radical with 1 to 12 carbon atoms, optionally containing a cyclic and/or an aromatic component and optionally having one or more heteroatoms; and $R^5$ represents an acyl radical or a linear or branched, monovalent hydrocarbon radical with 1 to 5 carbon atoms.

15. The composition according to claim 14, wherein in formula (V), $R^3$ represents a methyl or ethyl group, $R^4$ represents a linear or branched alkylene group with 1 to 6 carbon atoms, and $R^5$ represents a methyl, ethyl or isopropyl group.

16. A method for forming a molded body, the method comprising:
  heating the composition according to claim 1 to a temperature above its glass transition temperature $T_g$;
  shaping the composition under the tension of the chemically crosslinked elastomer based on a silane-functional polymer; and
  cooling the shaped composition to a temperature below its glass transition temperature $T_g$.

* * * * *